Jan. 9, 1951 E. F. ROSSMAN 2,537,423
SHOCK ABSORBER
Filed Aug. 6, 1947
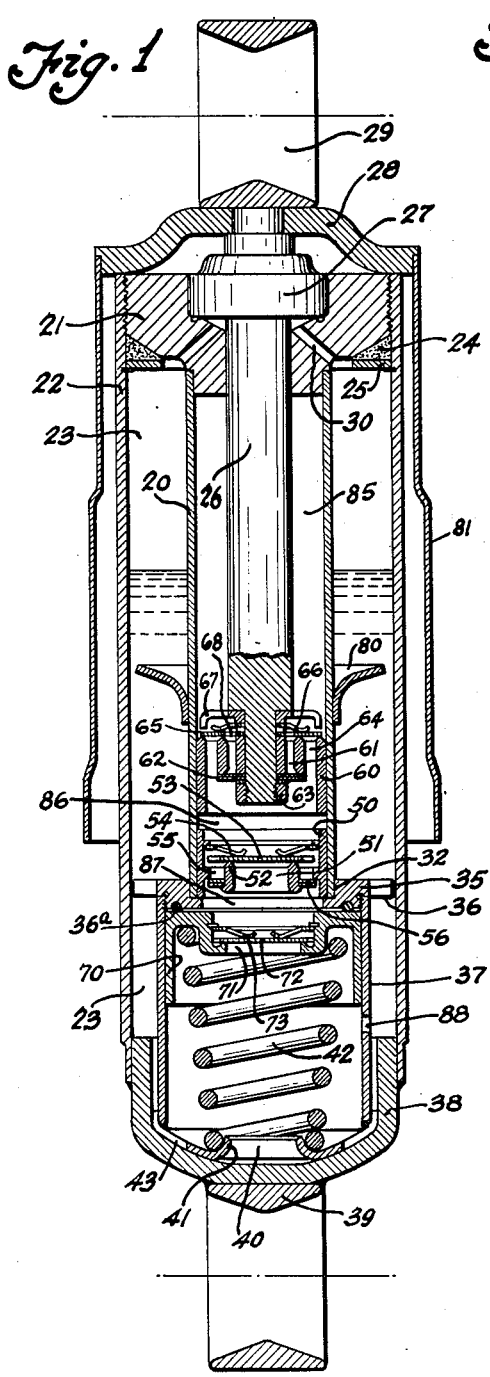
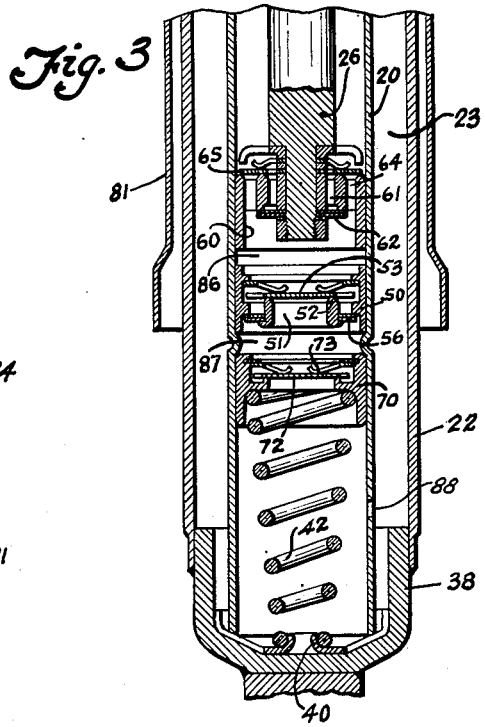
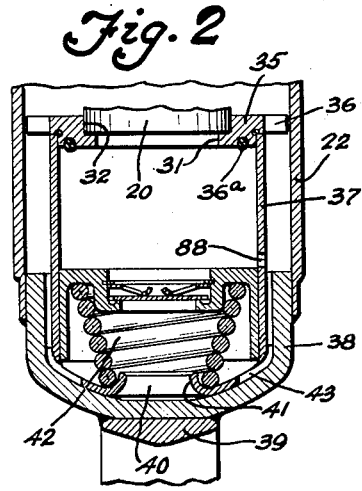
INVENTOR.
EDWIN F. ROSSMAN
BY
Spencer, Hartman and Fehrs
HIS ATTORNEYS Patented Jan. 9, 1951

2,537,423

UNITED STATES PATENT OFFICE 2,537,423

SHOCK ABSORBER

Edwin F. Rossman, Dayton, Ohio, assignor to General Motors Corporation, Detroit, Mich., a corporation of Delaware Application August 6, 1947, Serial No. 766,711

7 Claims. (Cl. 188—88)

This invention relates to improvements in direct acting, hydraulic shock absorbers. A direct acting hydraulic shock absorber is one having two relatively movable portions and when applied to relatively movable sprung and unsprung masses, for controlling their actions has one of its relatively movable portions directly attached to the sprung mass and the other portion directly attached to the unsprung mass.

It is among the objects of the present invention to provide a direct acting, hydraulic, shock absorber with means for supercharging the working chamber, thereby maintaining full volumetric efficiency.

This object is accomplished by providing the shock absorber with a spring loaded, floating piston in the reservoir space into which the piston rod displaced fluid is directed upon the movement of the piston in one direction, the spring loaded piston returning such rod displaced fluid under pressure to the working chamber upon movement of the piston in the opposite direction.

Further objects and advantages of the present invention will be apparent from the following description reference being had to the accompanying drawings wherein a preferred embodiment of the present invention is clearly shown.

In the drawings:

Fig. 1 is a longitudinal sectional view of a direct acting hydraulic shock absorber equipped with the present invention.

Fig. 2 is a fragmentary sectional view of parts shown in Fig. 1, certain parts however, being illustrated in different relative positions in this figure.

Fig. 3 is a fragmentary sectional view of a direct acting hydraulic shock absorber equipped with a modified form of the present invention.

Referring to the drawings and particularly to the Fig. 1 thereof the shock absorber is shown in fully collapsed position and comprises a cylinder 20. One end of this cylinder telescopically receives a portion of the head member 21, said head member being fitted into the cylinder substantially to prevent leaks at this point. A larger diameter portion of the head member 21 is exteriorly threaded so as to be screwed into the threaded end of a larger and surrounding tubular member 22. The annular space between the cylinder 20 and the tubular member 22 provides a reservoir 23 for the shock absorber. For purposes of this description this may be termed the "inactive reservoir." Any suitable sealing means 24 is clamped between the head member 21 and an abutment ring 25 so as to reduce and practically prevent fluid leaks past the threaded connection between the head member 21 and the tubular member 22.

Head member 21 has a central opening in which the piston rod 26 is slidably supported. Said head member has a recess in its outer end surface for receiving the packing gland 27 through which the piston rod 26 slidably extends to the exterior of the shock absorber. Rod 26 has a disc 28 attached to its outer end and a mounting ring 29 is attached to the disc. This mounting ring 29 provides means for securing the relatively movable portion including the piston rod 26 directly to one of the relatively movable members whose action the shock absorber is adapted to control.

Ducts 30 are provided in the head member 21, said ducts connecting the space in the recess, between the bottom thereof and the packing gland 27, with the reservoir space 23 so that any fluid tending to leak along the sliding connection between the pitson rod 26 and the head member 21 may be returned to the reservoir 23.

A disc 35 has a central opening 31 (see Fig. 2) and an annular recess 32 on one side, coaxial of said opening. The end of cylinder 20 seats in this recess 32 and the diameter of the central opening 31 in the disc is less than the inside diameter of the cylinder so as to provide an annular shelf upon which an element, to be described, rests. Tongues 36 extend radially from the edge of the disc 35 to maintain it central of the tube 22. Disc 35 has a cylindrical extension 37 which may be secured to the disc in any suitable manner or it may be formed integrally therewith so as to be concentric with the cylinder 20. On the side of the disc, opposite the cylinder 20, there is an annular groove in which a ring-shaped, resilient sealing and bumper element 36a is secured.

At the end of the tubular member 22 opposite the head member 21 there is attached a closure cup 38 secured to said tubular member in any suitable manner preferably by welding. Secured to the outer side of this cup 38 is a mounting ring 39 which is utilized to attach the other relatively movable portion of the shock absorber to the other relatively movable member whose action it is intended to control. Within this cup 38 there is provided a centralizing abutment member 40 having a central annular up-turned flange 41 about which one end of a coil spring 42 fits and rests upon. Radial fingers 43 extend from the central portion of this centralizing abutment member and fit the contour of the inner surface of the closure cup 38. The end of the cylinder 37 attached to disc 35 rests upon the radial fingers 43 thereby providing communication between the inside of the cylinder 37 and the annular space between it and the surrounding portion of the closure cup 38 and the tube 22. Thus it may be seen that the inactive reservoir portion 23 extends downwardly to the annular edge of the closure cup 38 then through the annular space between said cup and the cylinder 37 and then communicating with the interior of the cylinder 37 through the space between its edge and the bottom inner surface of the cup 38, provided by the radially extending fingers 43 of the centralizing abutment member 40.

From the aforegoing it may be seen that the interior of the cylinder 20 is in communication with the interior of the cylinder 37. In the cylinder 37 there is provided a valve cage 50 tightly fitted in this cylinder and as shown in Fig. 1 resting upon the annular shoulder provided by the recess 32 in disc 35 into which the cylinder 20 extends. The valve cage has a central opening 51 surrounded by an annular ridge 52 on the inside of the valve cage facing the head member 21. This annular ridge 52 provides a seat for the disc valve 53 yieldably urged upon said annular seat by inwardly extending radial spring fingers 54 secured within the valve cage in any suitable manner. A plurality of openings 55 are provided in the valve cage arranged in a circular row around the central openings 51 of said cage. These openings 52 are normally closed by a ring-shaped disc-valve 56 which is predeterminately biased against an inwardly extending annular shoulder in the valve cage by the spinning of the central portion of the valve cage against the inner portion of said disc-valve. As shown in Fig. 1 the disc valve engages the side of the valve cage opposite the side engaged by valve 53 so that this disc valve acts oppositely from the valve 53. From the foregoing it may be seen that this valve cage mechanism normally separates the interiors of the cylinders 20 and 37, the valve 53 thereof being operative to permit fluid to enter cylinder 20 from cylinder 37 and the valve 56 thereof being operative to permit fluid from cylinder 20 to enter cylinder 37.

Within the cylinder 20 there is provided a piston 60 attached to the inner end of the piston rod 26 so as to be reciprocated thereby. This piston has a plurality of through passages one group being arranged in a circular row about another group also arranged in a circular row around the piston rod. The passages 61 in the inner circular row are normally closed by a ring-shaped disc valve 62 clamped between the piston and a nut 63 which secures the piston to the piston rod. This ring-shaped disc valve 62 may consist of one or more ring shaped spring discs biased by the nut 63 so as to be pressed against the surface of the piston at a predetermined pressure. The passages 64 in the outer annular row are normally closed by a valve 65 urged against the piston to close said passages 64, by resilient spring fingers 66 formed on a ring clamped between a limiting retainer washer 67 on the piston rod and a washer on the rod between valve spring 66 and the adjacent valve 65. This valve 65 is apertured as at 68 which permits communication between the cylinder space between the piston 60 and head member 21 and the fluid passages 61 in the piston. From this it may be seen that the piston 60 is provided with valved passages adapted to control fluid flow through the piston in either direction as the piston is reciprocated within the cylinder. The valve 65 provides for a substantially unrestricted fluid flow through the piston toward the cylinder space surrounding the piston rod 26 as the piston is moved away from the head member 21 while the valve 62 is operative to establish a restricted flow of fluid in the opposite direction when the piston moves in the cylinder toward the head member 21. For the purpose of identification, this piston 60 may be termed "the positively actuated piston."

A floating piston 70 is provided in the cylinder 37. It has a central opening 71 in its head portion, surrounded by an annular ridge on the side of the piston adjacent the valve cage 50. A disc valve 72 is yieldingly maintained in engagement with the annular ridge surrounding the central opening 71 by resilient fingers 73 extending radially inwardly from a ring secured to the piston 70 in any suitable manner. The coil spring 42 heretofore described as having its one end fitted upon the centralized abutment member 40 has its opposite end engaging the piston 70 and yieldably urges said piston toward the disc 35 and into contact with the sealing and bumper ring 36a.

A baffle ring 80 is provided in the reservoir space 23 the inner annular edge of the said ring being secured to the cylinder 20, the outer annular edge being spaced from the inner annular surface of the tube 22.

A guard tube 81 surrounds the tubular member 22, one end of this guard tube 81 fitting around and being attached to the disc 28 so as to move therewith.

Fig. 1 shows the shock absorber in the fully collapsed position. When due to separating movements of the members, not shown, but to which the respective rings 29 and 39 are adapted to be anchored, the piston 60 is moved in cylinder 20 toward the head member 21, fluid within the working space 85 in the cylinder 20, having pressure exerted thereupon, will move valve 62 from engagement with the piston to open passages 61 and thereby permit the fluid to pass from the chamber 85 through piston passages 61 into the cylinder working chamber 86, between the piston and the valve cage 50. The volume of fluid so displaced will not be sufficient to fill this increasing space 86 between the piston 60 and the valve cage 50 due to the presence of the rod in chamber 85 and thus valve 53 will be lifted from engagement with its annular valve seat 52 to permit fluid in the space 87 which for purpose of description may be termed the "active reservoir," to flow through the valve cage past the valve 53 into the working space 86 above it. If the supply of fluid in the active reservoir 87 is insufficient to supply the necessary volume of fluid then valve 72 in piston 70 will be lifted against the effect of spring fingers 73 to permit fluid to flow from the inactive reservoir 23 and the communicating space inside the cylinder 37 past valve 72 into the active reservoir and then through the valve cage 50 past its valve 53 into the working space 86 directly beneath the piston 60. Valve 72 will not be lifted from its seat unless piston 70 is engaged with the bumper ring 36a.

When the movement of the piston 60 is reversed, pressure is exerted upon the fluid in the cylinder working chamber 86. The fluid pressure in chamber 86 is directed against the valve 56 in the valve cage 50 and the valve 65 in the piston 60 to operate them and open their respective fluid passages 55 and 64. A greater fluid pressure is necessary to open valve 56 than valve 65 so that the first flow of fluid from chamber 86, as the piston 60 moves toward the valve cage 50, will be through piston passages 64, past the valve 65 into the cylinder chamber 85. Due to the presence of the piston rod 26 in the cylinder chamber 85, all of the fluid displaced from chamber 86 cannot be received by chamber 85, therefore the fluid displaced by said piston rod 26 will act upon valve 56 in the valve cage 50, to operate it and establish a restricted fluid flow through the passage 55 into the active fluid reservoir space 87. Fluid delivered under pressure to chamber 87 will move the floating piston 70 in the cylinder 37 downwardly toward the closure cup 38, against the effect of the spring 42.

The present shock absorber is so designed that the maximum volume of the active reservoir space 87 is at least equal to and preferably slightly larger than the maximum volume of the fluid that may be displaced by the piston rod 26. This prevents bottoming on the striking of the element 40 by the piston 70 as illustrated in the Fig. 2. In use on automobiles, for which the present shock absorber is particularly designed, the piston 60 is rarely moved throughout the extreme limit of its travel and thus the capacity of the active reservoir 87 might ordinarily be reduced, however, for safety sake and to render the shock absorber operative under all conditions, the active reservoir 87 is, as has been mentioned sufficiently large to receive the maximum fluid displacement by the piston rod without moving the piston 70 against the bottom or end cup 38. As an added precaution openings 88 are provided in the wall of cylinder 37, so located that when the floating piston 70 reaches a predetermined position in its movement toward the closure cap 38, these openings will connect the active reservoir space 87 with the inactive reservoir 23 directly and thus permit excessive fluid, forced into the active reservoir space 87 to spill over into the inactive reservoir 23, thus limiting further movement of piston 70.

When the movement of the piston 60 toward the valve cage 50 stops, said movement having been caused by relative approaching movements of the two members (not shown) between which the shock absorber is connected, the fluid, displaced by the piston rod 26, will have moved the piston 70 in a direction away from the disc 35 against the effect of spring 42. Now this piston 70 exerts a pressure upon the fluid in the active reservoir space 87. As a result, and upon the next movement of piston 60 away from the valve-cage 50, this fluid in the active reservoir will be forced, under pressure of the spring loaded piston 70, into the working chamber 86, past the valve 53 in the valve cage.

If, due to internal leakage, the volume of fluid directed into the cylinder chamber 86 from the active reservoir 87 is less than the volume of fluid displaced by the piston rod 26, the valve 72 will be operated, when the piston 70 engages the bumper ring 36a, permitting fluid to be taken from the inactive reservoir and directed through the active reservoir 87 into the working chamber 86. The amount of this fluid taken from the inactive reservoir 23 due to such leaking is substantially equal to the volume of fluid lost from the cylinder content through said internal leakage and constitutes a fluid loss compensating supply which maintains the active fluid within the shock absorber at full volumetric efficiency resulting in a more efficient control by the shock absorber.

In the conventional shock absorber of this type and where constantly open orifices are provided to obtain a desired dampening effect, the fluid in the reservoir and that in the working chamber will seek a common level during inactivity. This tends toward the introduction of an undesirable amount of air into the cylinder working chamber which must be eliminated during shock absorber action before full efficiency is attained. By sealing the cylinder against leakage by the use of the sealing ring 36a, this level seeking action is entirely eliminated even though the valves 62 and 56 are provided with comparatively large and constantly open orifices.

On the other hand, if, due to variable length, successive strokes of the shock absorber piston in opposite directions, the active reservoir 87 does not contain a sufficient supply of fluid under pressure of piston 70, to satisfy the requirements of the working chamber 86 during an upward stroke of the piston 60, then valve 72 in the piston 70 will, when said piston 70 has reached its maximum up position by engaging the sealing bumper 36a, open to permit a flow of fluid from the inactive reservoir 23, through the active reservoir space 87 into the working chamber 86, thus supplying the additional fluid to meet volumetric requirements.

Due to the shaking of the shock absorber during use, the fluid in the inactive reservoir 23 becomes more or less aerated and aerated fluid when taken into the working chamber of a shock absorber in any substantial amounts greatly reduces the dampening effect of the shock absorber. However, with the present structure, the compensating supply of fluid is of such small volume that only a relatively small amount of aerated fluid is present in the working chamber of the cylinder, said small amount of aerated fluid having an unappreciable effect on the dampening efficiency of the shock absorber.

Fluid losses by internal leakage is substantially eliminated by the provision of the sealing and bumper ring 36a. After a period of rest and normally the piston 60 is midway between the head 21 and valve-cage 50, the chambers 86 and 87 filled with fluid and the floating piston held in sealing engagement with the ring 36a by the spring 42. Very little if any fluid will leak into the inactive reservoir space beneath the piston 70. The sealing engagement of piston 70 with ring 36a is especially advantageous to prevent loss of fluid from the cylinder during shock absorber inactivity when, as in some instances, valves 62 and 56 are provided with constantly open fluid flow orifices.

In the Fig. 3 an alternate construction is illustrated. Here the cylinder 20 continues uninterrupted to rest upon the radial spacing fingers 43 of the spring centralizing and abutment element 40. This construction eliminates the provision of the disc 35 in the construction shown in Fig. 1 and the tube portion 37 is now provided by a continuation of the main cylinder 20. Otherwise, the shock absorber construction of Fig. 3 is identical with that shown in Fig. 1 and functions in a like manner.

In either one of these constructions the shock absorber is provided with two fluid reservoir portions, that is the inactive portion 23 including also the portion inside the tube or cylinder portion 37 and the active reservoir portion between the piston 70 and the valve cage 50. The active reservoir portion directly supercharges the working chamber of the cylinder with fluid during operation of the device, the inactive reservoir portion on the other hand simply adds fluid to the active reservoir portion in case of a reduction of the necessary volume of fluid therein due to interior leakage.

While the embodiment of the present invention as herein disclosed, constitutes a preferred form, it is to be understood that other forms might be adopted, all coming within the scope of the claims which follow.

What is claimed is as follows:

1. A hydraulic shock absorber comprising a cylinder having a closure member at each end; a two-way valve mechanism secured in the cylinder and dividing it into two compartments; a piston in the one compartment, attached to a rod slidably extending through the one closure member, said piston having valved passages providing for controlled fluid flows through the piston in either direction; a floating piston in the other cylinder compartment, having a valved port providing for the flow of fluid only into the space between the floating piston and the valve mechanism; a spring interposed between the floating piston and the other, more adjacent closure member; a fluid reservoir in communication with the cylinder space occupied by the spring; and a normally ineffective opening in the cylinder, said opening being rendered effective to permit fluid to flow from the space between the floating piston and the valve mechanism and into the reservoir, when said floating piston is moved a predetermined distance from said valve mechanism.

2. A hydraulic shock absorber comprising a cylinder having a closure member at each end; a valve mechanism secured in the cylinder and dividing it into two compartments, said valve mechanism being operative to establish a substantially free flow of fluid in one direction and a restricted flow in the other direction between said compartments; a piston in each cylinder compartment, the one piston being positively reciprocated in its compartment and having valved passages certain of which are operative to establish a substantially free flow of fluid through the piston in one direction, the other a restricted flow in the opposite direction; the other piston having a valved port operative to permit a flow therethrough in one direction only, said other piston being actuated away from the valve mechanism by fluid pressure; a spring urging said other piston toward said mechanism; a fluid reservoir connected with the cylinder compartment on the side of said other piston engaged by the spring; and an opening in the wall of the cylinder and operative to provide communication between the reservoir and cylinder compartment between said other piston and valve mechanism only when said other piston has been moved a predetermined distance from said valve mechanism.

3. A hydraulic shock absorber comprising a cylinder divided into two working chambers by a piston attached to a rod which extends through and is slidably supported by a head member in one end of the cylinder; a fluid containing reservoir; a spring loaded, apertured partition, dividing the reservoir into two compartments one of which is in direct communication with one working chamber of the cylinder, a valve normally closing the aperture in the partition and operative to establish fluid flow from the one reservoir compartment into the reservoir compartment directly in communication with the cylinder; a two-way valve mechanism interposed between the said one working chamber of the cylinder and the reservoir compartment directly connected therewith, said valve mechanism being operative to establish a substantially free flow of fluid into said working chamber and a restricted flow of fluid from said chamber in response to movements of the piston away from and toward said valve mechanism respectively; valved passages in the piston for establishing fluid flows therethrough in either direction; and a normally inactive opening in one part of the reservoir, said opening being rendered active by movement of the floating piston into a predetermined position relatively to said valve mechanism, for directly connecting the two reservoir compartments.

4. A hydraulic shock absorber comprising two centrally aligned cylinders; a coupling ring securing the adjacent ends of said cylinders together; a piston in the one cylinder having a rod attached thereto, said rod slidably extending through a head member at the end of said one cylinder, said piston having valved passages providing for the transfer of fluid from one side of the piston to the other as said piston is reciprocated; a floating piston in the other cylinder, having a port normally closed by a valve to prevent fluid from flowing from the space between the two pistons through said port; a spring yieldably urging the floating piston toward the coupling ring; a fluid containing reservoir in communication with the end of said other cylinder opposite the coupling ring; a valve mechanism between the two pistons, operative to establish a substantially unrestricted fluid flow from the space between said mechanism and the floating piston into the space between said mechanism and the other piston as said other piston moves away from said mechanism and to establish a restricted flow of fluid in the opposite direction as said other piston moves toward the floating piston; and an opening in said other cylinder rendered operative to connect the space between the floating piston and the valve mechanism with the reservoir, only when said floating piston has been moved a predetermined distance from said valve mechanism.

5. A hydraulic shock absorber comprising a cylinder having a closure member at its one end, through which a rod slidably extends; a piston in said cylinder, attached to the rod and having valved passages providing for the controlled transfer of fluid from one side of the piston to the other as the piston is reciprocated; a flange ring attached to the cylinder at the end opposite the closure member; a valve mechanism in the cylinder supported by the ring, said valve mechanism being operative to establish a substantially free flow of fluid into the cylinder as the piston moves away from said mechanism and a restricted flow from the cylinder as the piston moves toward said mechanism, a tubular member having one end attached to the ring; a fluid containing reservoir in communication with the other end of the tubular member; a floating piston in said tubular member, said piston having an opening surrounded by a valve seat on the side of said floating piston adjacent the valve mechanism; a valve yieldably urged to close said opening; a spring yieldably urging the floating piston toward the ring; and an opening in the side of the tubular member operative to connect the reservoir and the interior of the tubular member above the valve of the floating piston, only when the floating piston reaches a predetermined position relatively to the valve mechanism.

6. A hydraulic shock absorber comprising, two cylinders joined together, each having a piston therein, the one piston in the first cylinder being secured to a rod slidably extending through a head member at the outer end of the first cylinder, the second, floating piston in the second cylinder being yieldably urged toward the first cylinder by a spring interposed between the second piston and a cover cap of the second cylinder, the said one piston having valved passages providing for the transfer of fluid from one side of the piston to the other as said piston is actuated by the rod, the second piston having a valved port providing only for the flow of fluid into the space between the two pistons; a valve mechanism interposed between the two pistons, said valve mechanism providing for a substantially free flow of fluid from the space between said mechanism and the floating piston into the space between said mechanism and the first piston as said first piston moves away from said mechanism and providing for a restricted fluid flow in the opposite direction through said mechanism as the first piston moves toward said mechanism; a tubular member surrounding both cylinders, the ends of the tubular member being secured respectively to the head member and end cap of the two cylinders, said tubular member providing a fluid containing reservoir which is in communication with the second cylinder at its end cap end; a normally ineffective opening in the wall of the second cylinder, said opening being rendered effective to permit fluid in the space between said valve mechanism and the floating piston to enter the fluid reservoir when said floating piston is moved a predetermined distance away from said valve mechanism.

7. A hydraulic shock absorber comprising in combination, a cylinder; a two-way valve mechanism fixed in the cylinder and dividing it into two compartments; a reciprocative, valved piston in each compartment, one piston being positively actuated, the other being spring loaded and actuated in one direction by fluid pressure resulting from the movement of the said one piston in a direction toward the valve mechanism; a fluid supply chamber in constant communication with the cylinder compartment beneath the spring loaded piston; and means rendered effective by movement of said floating piston into a predetermined position to relieve the pressure in the cylinder space above said floating piston by connecting it directly with the fluid supply chamber.

EDWIN F. ROSSMAN.

REFERENCES CITED

The following references are of record in the file of this patent:

UNITED STATES PATENTS

| Number | Name | Date |
| --- | --- | --- |
| 2,126,880 | Gardner | Aug. 16, 1938 |
| 2,327,295 | Whisler | Aug. 17, 1943 |
| 2,360,755 | Boor | Oct. 17, 1944 |